US007562044B1

(12) United States Patent
Tenorio

(10) Patent No.: US 7,562,044 B1
(45) Date of Patent: Jul. 14, 2009

(54) SYSTEM AND METHOD FOR DYNAMIC PRICING IN AN UNBALANCED MARKET

(75) Inventor: Manoel Tenorio, Mountain View, CA (US)

(73) Assignee: i2 Technologies US, Inc., Dallas, TX (US)

(*) Notice: Subject to any disclaimer, the term of this patent is extended or adjusted under 35 U.S.C. 154(b) by 1467 days.

(21) Appl. No.: 09/945,296

(22) Filed: Aug. 31, 2001

(51) Int. Cl.
*G06Q 40/00* (2006.01)
(52) U.S. Cl. .......................................... 705/37; 705/26
(58) Field of Classification Search ................... 705/80, 705/37, 1, 400
See application file for complete search history.

(56) References Cited

U.S. PATENT DOCUMENTS

| | | | | |
|---|---|---|---|---|
| 6,047,274 | A * | 4/2000 | Johnson et al. | 705/412 |
| 6,078,906 | A * | 6/2000 | Huberman | 705/37 |
| 6,415,270 | B1 * | 7/2002 | Rackson et al. | 705/36 R |
| 6,598,029 | B1 * | 7/2003 | Johnson et al. | 705/37 |
| 6,871,191 | B1 * | 3/2005 | Kinney et al. | 705/37 |
| 6,952,682 | B1 * | 10/2005 | Wellman | 705/37 |
| 7,039,603 | B2 * | 5/2006 | Walker et al. | 705/26 |
| 7,058,602 | B1 * | 6/2006 | La Mura et al. | 705/37 |
| 2002/0143692 | A1 * | 10/2002 | Heimermann et al. | 705/37 |

OTHER PUBLICATIONS

Laurie Sullivan, Evolving From Storefronts To High-Tech Trading, Electronic Buyers' News. Oct. 30, 2000, p. 1-4.*
Curtis R. Taylor, "The Long Side of the Market and the Short End of the Stick: Bargaining Power and Price Formation in Buyers', Sellers', and Balanced Markets", The Quarterly Journal of Economics, vol. 110, No. 3 (Aug. 1995), p. 1-20.*
Lucio Munoz, "The Traditional Market and the Sustainability Market: Is the Perfect Market Sustainable?", Independent Researcher, Vancouver, BC, Canada, International Journal of Economic Development, pp. 1-14.*
@The Moment: The Platform for Real-Time Trading; "How Quickly Can You Respond to Your Markets?" pp. 1, 2001.
@The Moment Solutions; "Dynamic Trading for a Dynamic World" pp. 1, 2001.

(Continued)

*Primary Examiner*—Hani Kazimi
*Assistant Examiner*—Gregory Johnson
(74) *Attorney, Agent, or Firm*—Booth Udall, PLC; Steven J. Laureanti

(57) ABSTRACT

An electronic marketplace includes one or more computers supporting a market. There are fewer participants on a first side of the market than on a second side. Participants on the first side have a greater market capacity than market participants on the second side. Offers on the first side are inaccessible and offers on the second side are accessible to the participants. Offers are received from participants on the first side and participants on the second side. Each offer includes an offered price and an offered quantity. Any offers on the first side that include equal offered prices and any offers on the second side that include equal offered prices are prioritized according to a prioritization scheme, which determines the order in which they are matched with other offers. A first offer on the first side is matched with a second offer on the second side according to a relationship between offered prices associated with the first and second offers, and a strike price is determined based on the relationship.

32 Claims, 2 Drawing Sheets

OTHER PUBLICATIONS

Trade@The Moment: The Platform for Real-Time Trading; pp. 1-2, 2001.
@The Moment Real-Time Trading Applications; pp. 1-2, 2001.
@The Moment Professional Services; pp. 1, 2001.
@The Moment Trade @The Moment FAQ; "Frequently Asked Questions (FAQ) About Dynamic Trading" pp. 1-9, 2001.
Trade@The Moment Demos; pp. 1, 2001.
@The Moment Screen Shots; pp. 1-3, 2001.
Market Operator Navigation; pp. 1, 2001.
Market Type Selection Page; pp. 1-2, 2001.
Market Access Control Selection Page; pp. 1-2, 2001.
Market Report; "marketplace@themoment;" pp. 1, 2001.
Bid/Ask Pricing Page, pp. 1-4, 2001.
Bid/Ask Page/Pitometer; pp. 1-4, 2001.
Bid/Ask Page/Order Book; pp. 1-4, 2001.
@TheMoment Technology; pp. 1-2, 2001.
@TheMoment Papers; pp. 1, 2001.
@TheMoment Reliant Energy Customer Story, "Reliant Energy Turns to @TheMoment to Provide First ERCOT Auction for Electricity Generation Capacity;" pp. 1-2.
@TheMoment White Paper Series; "Leveraging Web-Based Dynamic Trading for Gas Pipeline Capacity Sales;" pp. 1-8, Jul. 2001.
@TheMoment White Paper Series; "Building Competitive Advantage in Turbulent Markets Through Web-Based Dynamic Trading Technologies;" pp. 1-12, Aug. 2001.
@TheMoment White Paper Series; "Reducing Inventory Risks in High-Tech Component Manufacturing with Forward Contracts;" pp. 1-12, Aug. 2001.
@TheMoment White Paper Series; "The Role off Web-Based Dynamic Trading in Restructured Electric and Gas Markets;" pp. 1-14, Oct. 2001.
Trade@TheMoment: LDC Data Sheet; "The Complete Trading Solution for LDCs;" pp. 1-4, Oct. 2001.
Trade@TheMoment:Power Data Sheet; "The Complete Trading Solution for Electric Utilities;" pp. 1-2, Nov. 2001.
Auction Page; pp. 1-4, 2001.
@The Moment Papers; pp. 1, 2001
@TheMoment White Papers; pp. 1, 2001.

* cited by examiner

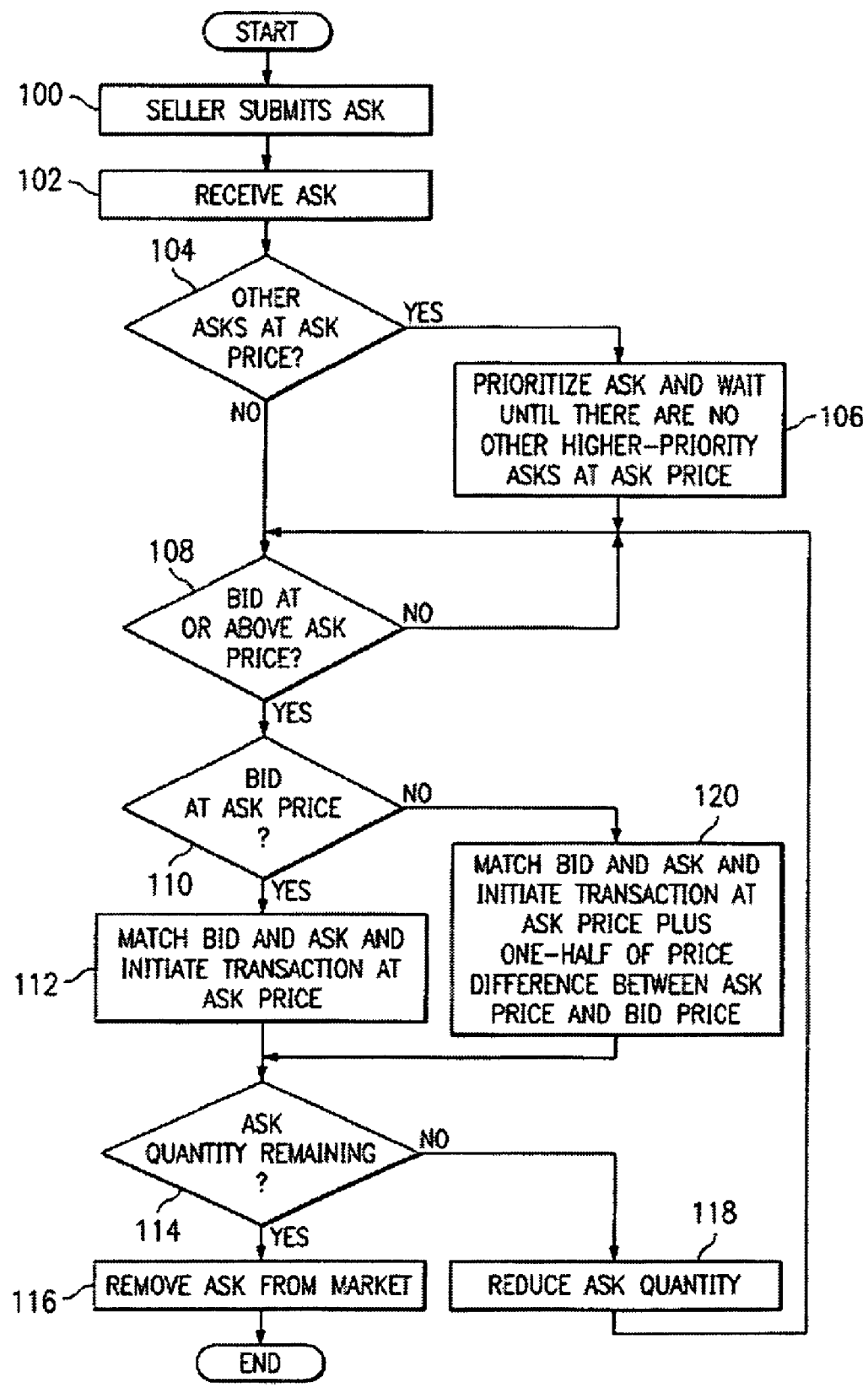

SYSTEM AND METHOD FOR DYNAMIC PRICING IN AN UNBALANCED MARKET

TECHNICAL FIELD OF THE INVENTION

This invention relates generally to electronic commerce and more particularly to dynamic pricing in an unbalanced market.

BACKGROUND OF THE INVENTION

Business transactions are increasingly taking place over the Internet and other electronic communication networks. Electronic markets may provide a forum for such transactions, allowing buyers to locate sellers, and vice versa. This process may involve a buyer (or seller) identifying a seller (or buyer) offering to sell (or buy) a suitable quantity of a particular item at a suitable price. Typically, the buyer wants to buy at the lowest possible price, and the seller wants to sell at the highest possible price. Market prices (meaning prices at which transactions between buyers and sellers actually take place) may be determined by the relative buying and selling pressures in the market. These pressures may be in constant flux, causing market prices to change over time.

In a fair market, no particular buyer or seller (or relatively small group of buyers or sellers) may control market prices. As a result, market prices may better reflect actual buying and selling pressure in a fair market. While a fair market may be an ideal market for business transactions, few actual markets are in fact fair markets. In an electronic market, for example, one side of the market may include fewer market participants than the other side of the market, and those market participants may each have a capacity to buy or sell that is substantially greater than the capacity of the individual market participants on the other side of the market to sell or buy. Such a market may be referred to as an "unbalanced" market. In such a market, the larger-capacity market participants on the less populous side of the market may have disproportionate control over market prices (due to their buying or selling power relative to the other market participants), resulting in a market that is not substantially fair.

SUMMARY OF THE INVENTION

According to the present invention, disadvantages and problems associated with previous electronic markets may be substantially reduced or eliminated.

In one embodiment of the present invention, an electronic marketplace includes one or more computers collectively supporting a market having two sides and in which there are generally substantially fewer market participants associated with the first side than with the second side. Each market participant associated with the first side generally has a substantially greater market capacity than each market participant associated with the second side. The first side is substantially sealed such that offers associated with the first side are substantially inaccessible to substantially all of the market participants, and the second side is substantially open such that offers associated with the second side are substantially accessible to substantially all of the market participants. The one or more computers collectively receive offers from market participants associated with the first side and from market participants associated with the second side. Each offer includes at least an offered price and an offered quantity. The one or more computers prioritize among any offers associated with the first side that include substantially equal offered prices and among any offers associated with the second side that include substantially equal offered prices according to a predetermined prioritization scheme. The prioritization among such substantially equally priced offers determines the order in which they are matched with other offers. The one or more computers also match a first offer associated with the first side with a second offer associated with the second side according to a relationship between a first offered price associated with the first offer and a second offered price associated with the second offer and determine a strike price for the match between the first offer and the second offer based on the relationship between the first and second offered prices.

Particular embodiments of the present invention may provide one or more technical advantages. For example, particular embodiments of the present invention may provide a substantially fair market that includes a consortium of larger-capacity buyers (or sellers) on one side of the market and a multitude of smaller-capacity sellers (or buyers) on the other side of the market. In particular embodiments, the bids (or asks) on the less populous side of the market may be sealed (meaning substantially not visible or otherwise inaccessible to at least a subset of all market participants), while the asks (or bids) on the more populous side of the market may be open (meaning substantially visible or otherwise accessible to at least a subset of all market participants). In particular embodiments, an open offer to buy or sell may be cancelled or otherwise removed from the market without any reason being given to market participants for the removal, which may make it more difficult for market participants to surmise particular market prices. In particular embodiments, the strike price (meaning the price at which a transaction has actually taken place) between a crossed bid and ask (meaning that the corresponding bid price is greater than the corresponding ask price) may be the ask price plus a portion of the price difference between the ask price and the bid price, which may serve to penalize the corresponding buyer and seller for creating a crossed market and deter market participants on the open side of the market from submitting bids or asks that substantially lead other bids or asks on the open side of the market in an attempt to gain information about the closed side of the market not otherwise visible (or otherwise accessible) to market participants. Particular embodiments of the present invention may also combine one or more advantages of a "request for quote" (RFQ) market with one or more advantages of an auction or an exchange market.

Systems and methods incorporating one or more of these or other technical advantages may be well suited for modern electronic markets. Other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example method for providing dynamic pricing in an unbalanced market.

DETAILED DESCRIPTION OF EXAMPLE EMBODIMENTS

Figure 1:
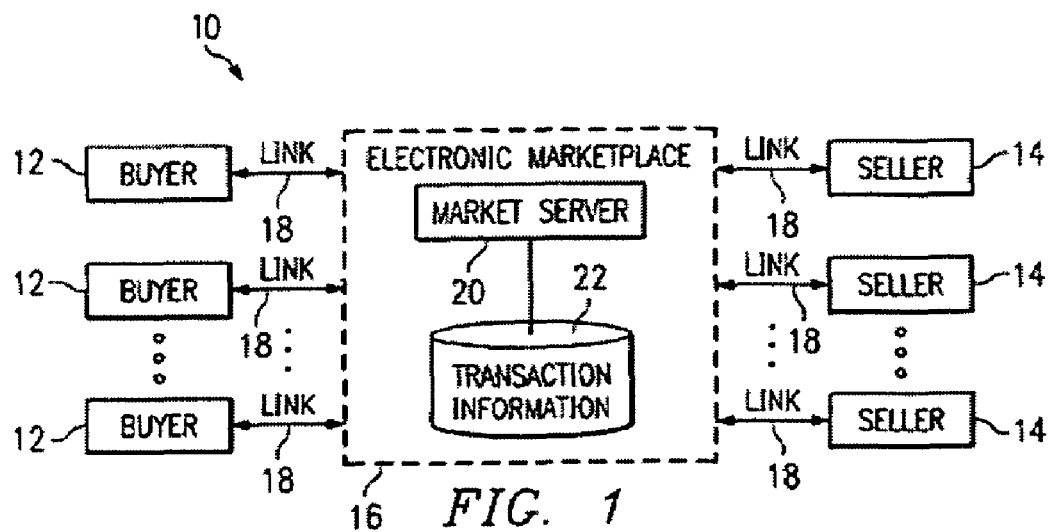
FIG. 1 illustrates an example system supporting one or more electronic markets.

FIG. 1 illustrates an example system 10 supporting one or more electronic markets. System 10 may include one or more buyers 12, one or more sellers 14, and at least one electronic marketplace 16 associated with a web site or other environment accessible to buyers 12 and sellers 14. In general, electronic marketplace 16 or an associated device may receive bids from buyers 12 and asks from sellers 14 and, when a strike occurs, initiate a transaction between the corresponding buyer 12 and seller 14. A bid may include an offer to buy a particular number of items (which may include raw materials, component parts, products, or other tangible or intangible things that may be the subject of a transaction between buyer 12 and seller 14) at a particular price, and an ask may include an offer to sell a particular number of items at a particular price. A strike between a particular bid and a particular ask may occur when the corresponding bid price is greater than or substantially equal to the corresponding ask price and may result in a transaction between the corresponding buyer 12 and seller 14.

Although buyers 12 and sellers 14 are described as separate entities, a buyer 12 in one transaction may be a seller 14 in another transaction, and vice versa. Moreover, reference to a "buyer" or a "seller" may include a person, a computer system, an enterprise, or any other buying or selling entity, as appropriate. For example, a buyer 12 may include a computer programmed to autonomously identify a need for an item, search for that item, and buy that item upon identifying a suitable seller. Although buying and selling are primarily described herein, the present invention contemplates any appropriate market transaction.

Buyers 12, sellers 14, and electronic marketplace 16 may be coupled to each other using links 18 that may each include one or more local area networks (LANs), metropolitan area networks (MANs), wide area networks (WANs), a portion of the Internet, or any other appropriate wireline, optical, wireless, or other links. The components of electronic marketplace 16 may operate on one or more computers at one or more locations, and electronic marketplace 16 may share one or more computers or other resources with one or more buyers 12 or one or more sellers 14, according to particular needs. Bids and asks may be received by electronic marketplace 16 or an associated device in any suitable format, such as in the form of Hypertext Markup Language (HTML), Extensible Markup Language (XML), or other suitable files within Hypertext Transport Protocol messages.

Associated with electronic marketplace 16, at one or more locations integral to or separate from electronic marketplace 16, may be one or more market servers 20 and one or more databases containing transaction information 22. In general, market server 20 may support a particular electronic market for a particular item or set of items. For example, market server 20 may receive bids from buyers 12 and asks from sellers 14, prioritize bids and asks, determine when a strike occurs between a particular bid and ask, determine a strike price, cancel a bid or ask automatically or at the request of the corresponding buyer 12 or seller 14 or otherwise remove a bid or ask from the market, keep a record of a particular strike by storing associated transaction information 22, initiate a transaction between buyer 12 and seller 14 when a strike occurs, and perform other suitable tasks associated with supporting an electronic market. Transaction information 22 may include a number of records, each corresponding to a particular strike. A record of a strike may reflect a strike price, a date and time, information identifying buyer 12 and seller 14, and a strike quantity. Transaction information 22 may be used by buyer 12, seller 14, and other appropriate entities to finalize a transaction between buyer 12 and seller 14 initiated as the result of a strike and for other suitable purposes.

Figure 2:
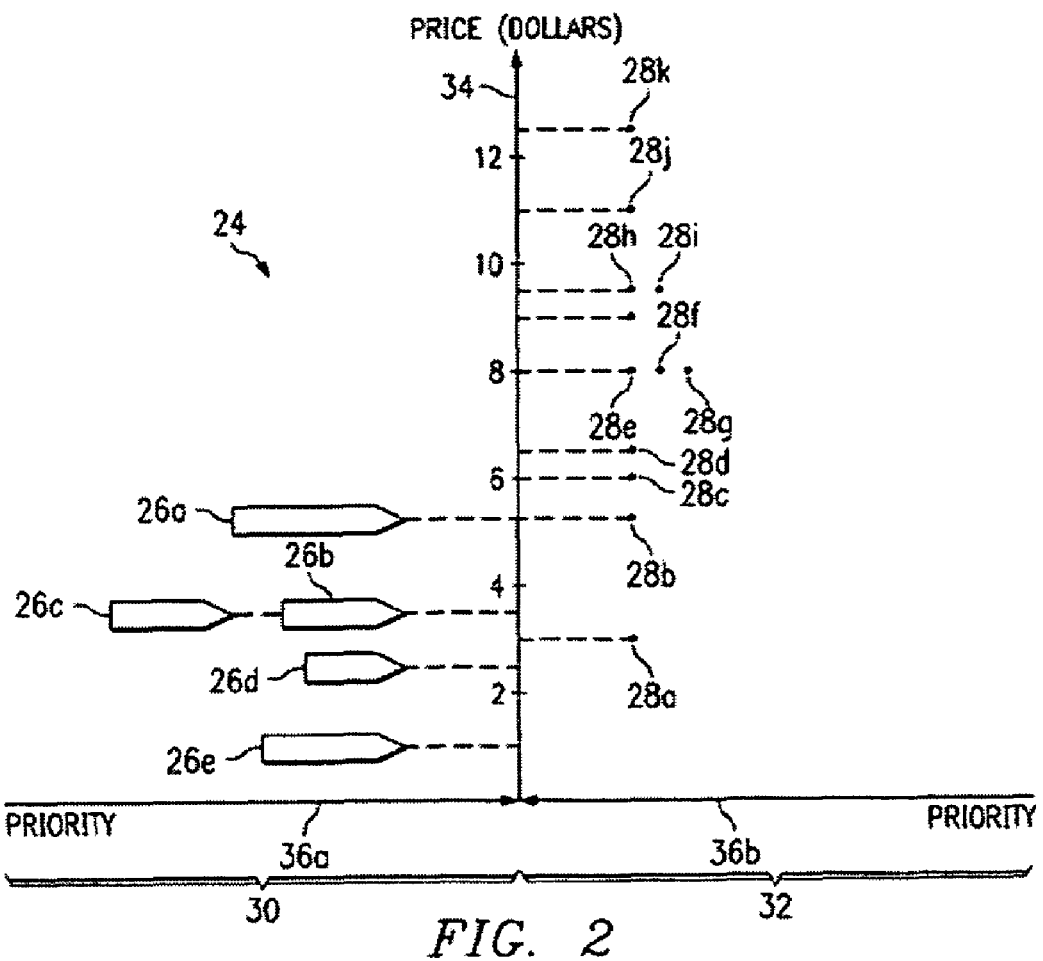
FIG. 2 illustrates a graphical and conceptual representation of an example market including bids and asks.

FIG. 2 illustrates a graphical and conceptual representation of example market 24 including bids 26 (which may include offers to buy) and asks 28 (which may include offers to sell). Market 24 may be supported by market server 20 and other devices associated with electronic marketplace 16 and may provide a forum for transactions between buyers 12 and sellers 14 involving a particular class of items. Market 24 may include a bid side 30, an ask side 32, and one or more vectors, such as per-item price vector 34 and priority vectors 36, each associated with different aspects of bids 26 and asks 28 within market 24. In one embodiment, market 24 may combine one or more features of a "request for quote" (RFQ) or other suitable market with one or more features of an auction, exchange, or other suitable market.

Bid side 30 may include one or more bids 26, each including a bid price (meaning the price at which buyer 12 is offering to buy) and a bid quantity (meaning the quantity buyer 12 is offering to buy). For example, bid 26a may include a bid price of approximately $5.20 (which may be graphically represented by the placement of bid 26a along price vector 34 at approximately $5.20) and a particular bid quantity (which may be graphically represented by the length (as shown), color, shape, or any other suitable aspect of the graphical representation of bid 26a). As described above, bid side 30 may be sealed such that certain information pertaining to bid side 30 is substantially not visible to at least some of the market participants. Nonetheless, bid side 30 may be graphically represented as described herein to some of the market participants or others according to particular needs. Two or more bids 26 at substantially similar bid prices may be prioritized according to any suitable scheme, which may determine the order in which such bids are matched with one or more asks 28. In one embodiment, later-received bids 26 may be given lower priority than earlier-received bids 26 at the same bid price, and higher-priority bids 26 may be matched with one or more asks 28 before lower-priority bids 26. For example, bids 26b and 26c both include a bid price of approximately $3.80, but bid 26b was received before bid 26c. Therefore, bid 26b may be given higher priority than bid 26c, as indicated by the relative placements of bids 26b and 26c along priority vector 36a, and bid 26b may be matched with one or asks 28 before bid 26b.

Ask side 32 may include one or more asks 28, each including an ask price (meaning the price at which seller 14 is offering to sell) and an ask quantity (meaning the quantity seller 14 is offering to sell). Ask prices may be graphically represented by the placement of asks 28 along price vector 34, whereas ask quantities associated with asks 28 may be excluded from a graphical representation of example market 24. Excluding ask quantities from a graphical representation of example market 24 may, together with other features of example market 24, make it more difficult for buyers 12 and sellers 14 to surmise strike prices, market activity on bid side 30, or other aspects of example market 24 that may be desirable to keep hidden from buyers 12 and sellers 14, as described more fully below.

In example market 24, there may be fewer buyers 12 than sellers 14, and buyers 12 may individually have buying capacities much greater than the individual selling capacities of sellers 14. In keeping with this relationship between buyers 12 and sellers 14 in example market 24, bid side 30 may include a relatively small number of bids 26 from a relatively of small number of buyers 12, and the bid quantities associated with bids 26 may be substantially larger than the ask quantities associated with asks 28. In contrast, ask side 32 may include a relatively large number of asks 28 from a relatively large number of sellers 14, and the ask quantities associated with asks 28 may be substantially smaller than the bid quantities associated with bids 26. As a result of these (and possibly other) differences between the supply and demand sides of example market 24, buyers 12 may have substantial control over market prices within market 24, which may result in a market that is not substantially fair. Although a particular example market 24 is described herein, in which buyers 12 have disproportionate control over market prices, the present invention contemplates market participants on either side of market 24 having disproportionate control over market prices for any suitable reasons.

To reduce the disproportionate control that buyers 12 may have over market prices in market 24, bid side 30 may be "sealed" such that bid side 30 is substantially not visible (as described above, information that is not visible may be otherwise inaccessible) to at least a subset of buyers 12 and sellers 14, while ask side 32 may be left open such that ask side 32 is at least partially visible (as described above, information that is visible may be otherwise accessible) to at least a subset of buyers 12 and sellers 14. For example, bid side 30 may be sealed such that no buyers 12 or sellers 14 may view bids 26 or the corresponding bid prices and quantities, and ask side 32 may be open such that buyers 12 and sellers 14 may view ask prices associated with individual asks 28. While ask side 32 may be open to buyers 12 and sellers 14, not all information associated with asks 28 may be made visible to buyers 12 and sellers 14. For example, as described above, ask quantities associated with asks 28 may not be visible to buyers 12 or sellers 14. Moreover, when a particular ask 28 is removed from ask side 32, no indication may be given to buyers 12 or sellers 14 whether ask 28 was removed due to the cancellation of ask 28 or due to a strike between ask 28 and a particular bid 28. Accordingly, certain information reflecting market conditions for market 24 may be withheld from buyers 12 and sellers 14 to create a market that is substantially fairer than it might be otherwise. For example, withholding such information may make it more difficult for market participants to surmise particular market prices. Although particular examples of information being withheld from buyers 12 and sellers 14 have been described, the present invention contemplates any suitable information pertaining to example market 24 being withheld from any suitable market participants. Embodiments of the present invention may, in this way, provide a substantially fair market that includes a consortium of larger-capacity buyers (or sellers) on one side of the market and a multitude of smaller-capacity sellers (or buyers) on the other side of the market.

A strike may occur between a particular bid 26 and ask 28 when the bid price associated with bid 26 is substantially equal to the ask price associated with ask 28. A strike between bid 26 and ask 28 may involve matching bid 26 with ask 28, initiating a transaction between the corresponding buyer 12 and seller 14, and removing all or a portion of bid 26 and ask 28 from example market 24. For example, bid 26a may include a bid price of approximately $5.20 and a bid quantity of two hundred items, and ask 28b may include an ask price of $5.20 and an ask quantity of twenty items. The bid price associated with bid 26a is approximately equal to the ask price associated with ask 28b, and a strike may therefore occur between bid 26a and ask 26b. When a strike between bid 26a and ask 28b occurs, a transaction involving the sale of twenty items at a price of $5.20 per item may be initiated between the corresponding buyer 12 and seller 14, transaction information 22 pertaining to the strike (such as the date and time of the strike, the identity of buyer 12 and seller 14, the strike price, and the strike quantity) may be recorded, bid 26a may be reduced in quantity by twenty items, and ask 28b may be removed from market 24. As described above, bid side 30 may be sealed, and the reduction in quantity of bid 26a (similar to the original quantity of bid 26a) may not be made visible to buyer 12 and sellers 14. Additionally, buyers 12 and sellers 14 may be given no indication whether ask 28b was removed due to the occurrence of a strike or due to the cancellation of ask 28b.

A strike may also occur between a particular bid 26 and ask 28 when the bid price associated with bid 26 is substantially greater than the ask price associated with ask 28, and the corresponding strike price between such a "crossed" bid 26 and ask 28 may be the ask price associated with ask 28 plus a portion of the price difference between bid 26 and ask 28. In one embodiment, the strike price between a crossed bid 26 and ask 28 may be a fraction, such as one-half, of the price difference between bid 26 and ask 28. For example, bid 26a may include a bid price of approximately $5.20 and a bid quantity of two hundred items, as described above, and ask 28a may include an ask price of $3.20 and an ask quantity of five items. The bid price associated with bid 26a is substantially greater than the ask price associated with ask 28a, and a strike may therefore occur between bid 26a and ask 28a. When a strike between bid 26a and ask 28a occurs, a transaction involving the sale of twenty items at a price of $4.20 (which represents $3.20 plus one-half of the difference between the bid and ask prices associated with bid 26a and ask 28a, respectively) per item may be initiated between the corresponding buyer 12 and seller 14, transaction information 22 pertaining to the strike may be recorded, bid 26a may be reduced in quantity by five items, and ask 28b may be removed from market 24. By setting the strike price for a strike associated with a crossed bid 26 and ask 28 somewhere between the corresponding bid and ask prices, buyers 12 and sellers 14 may be penalized for creating a crossed market, and sellers 14 may be deterred from submitting asks that substantially lead other asks in an attempt to gain information about bid side 30 of market 24 not otherwise visible to buyers 12 or sellers 14. Although a particular technique for handling crossed markets has been described, the present invention contemplates the use of any suitable crossed market-handling techniques.

When there are multiple bids 26 that include bid prices substantially equal to or greater than one or more ask prices associated with one or more asks 28, market server 20 may match such bids 26 with such asks 28 in a suitable order. In one embodiment, market server may match the highest-priority leading bid 26 with the highest-priority leading ask 28 before matching any other bids 26 and asks 28, and so on. A particular bid 26 may be successively matched with multiple asks 28 until the entire bid quantity associated with bid 26 has been depleted, and vice versa. For example, a bid 26 including an original bid quantity of one hundred items may be successively matched with asks including ask quantities of twenty, forty, ten, twenty-five, and five items, respectively, before being removed from market 24.

FIG. 3 illustrates an example method for providing dynamic pricing in an unbalanced market. The method begins at step 100, where a seller 14 submits to market server 20 an ask 28 specifying an ask price and an ask quantity. Market server 20 receives the submitted ask at step 102. Although market server 20 is particularly described as performing different tasks associated with providing dynamic pricing in an unbalanced market, the present invention contemplates any suitable combination of devices internally or externally associated with electronic marketplace 16 performing such tasks. At step 104, market server 20 determines whether other asks 28 at the specified ask price are already present in market 24.

If other asks 28 at the specified ask price are present in market 24, market server 20, at step 106, prioritizes the received ask 28 behind the other asks 18 at the specified ask price. As described above, the priority given ask 28 may determine the order in which ask 28 is matched with a particular bid 26 relative to other asks 28 at the same ask price. At step 108, market server 20 determines whether there is a bid 26 on bid side 32 at or above the specified ask price.

If there is a bid 26 on bid side 32 at or above the specified ask price, market server 20 determines whether the bid price associated with bid 26 is substantially equal to the specified ask price at step 110 If the bid price is substantially equal to the specified ask price, market server 20, at step 112, matches bid 26 with ask 28 and initiates a transaction between the corresponding buyer 12 and seller 14 wherein the per-item price is substantially equal to the bid and ask price. At step 114, market server 20 determines whether the entire specified ask quantity was depleted in the initiated transaction. If the entire specified ask quantity was depleted, market server 20 removes ask 28 from market 24 at step 116, and the method ends. As described above, ask 28 may be removed from market 24 without any indication being given that a strike occurred between bid 26 and ask 28. If the entire ask quantity was not depleted, market server 20, at step 118, reduces the ask quantity by the number of items depleted. As further described above, the ask quantity associated with a particular ask 28 may not be made visible to buyers 12 and sellers 14. Accordingly, the reduction in quantity of ask 28 may not be visible to buyers 12 and sellers 14.

Referring again to step 110, if the bid price is substantially above the specified ask price, market server 20 matches bid 26 with ask 28 and initiates a transaction between the corresponding buyer 12 and seller 14 wherein the per-item price is equal to the specified ask price plus one-half of the price difference between the specified ask and bid prices. Although a particular technique for determining a strike price between a crossed bid 26 and ask 28 has been described, the present invention contemplates any suitable technique for determining an appropriate strike price between a crossed bid 26 and ask 28.

Although the present invention has been described with several embodiments, divers changes, substitutions, variations, alterations, and modifications may be suggested to one skilled in the art, and it is intended that the invention may encompass all such changes, substitutions, variations, alterations, and modifications fall within the spirit and scope of the appended claims.

What is claimed is:

1. An electronic marketplace for dynamic pricing in an unbalanced market, the electronic marketplace comprising:

a first side of the unbalanced market comprising a plurality of market participant user computers coupled with the electronic marketplace;

a second side of the unbalanced market comprising a plurality of market participant user computers coupled with the electronic marketplace, each market participant user computer associated with the first side of the unbalanced market having a larger market capacity than each market participant user computer associated with a second side of the unbalanced market and each market participant user computer associated with the second side of the unbalanced market having a smaller-capacity than each market participant user computer associated with the first side of the unbalanced market;

one or more computers collectively supporting the unbalanced market, the one or more computers collectively configured to:

receive offers from the one or more market participant user computers that is associated with the first side of the unbalanced market and from the one or more market participant user computers that is associated with the second side of the unbalanced market, each offer comprising at least an offered price and an offered quantity;

prioritize among any offers associated with the first side of the unbalanced market that comprise equal offered prices and among any offers associated with the second side of the unbalanced market that comprise equal offered prices according to a predetermined prioritization scheme, the prioritization among such equally priced offers determining the order in which they are matched with other offers;

match a first offer associated with the first side of the unbalanced market with a second offer associated with the second side of the unbalanced market according to a relationship between a first offered price associated with the first offer and a second offered price associated with the second offer; and determine a strike price for the match between the first offer and the second offer based on the relationship between the first and second offered prices.

2. The electronic marketplace of claim 1, wherein:

the first side of the unbalanced market comprises a bid side, the one or more market participant user computers that are associated with the first side of the unbalanced market comprise buyers, and the offers associated with the first side of the unbalanced market comprise bids; and the second side of the unbalanced market comprises an ask side, the one or more market participant user computers that are associated with the second side of the unbalanced market comprise sellers, and the offers associated with the second side of the unbalanced market comprise asks.

3. The electronic marketplace of claim 1, wherein the first side of the unbalanced market is sealed such that offered prices and offered quantities of offers associated with the first side of the unbalanced market are inaccessible to one or more market participant user computers.

4. The electronic marketplace of claim 1, wherein the second side of the unbalanced market is open such that offered prices of offers associated with the second side of the unbalanced market are accessible to one or more market participant user computers.

5. The electronic marketplace of claim 1, wherein the equally priced offers are prioritized according to the order in which they are received, an earlier-received offer being given a higher priority than a later-received offer having an equal offered price.

6. The electronic marketplace of claim 1, wherein: the relationship between the first and second offers comprises the first and second offered prices being equal to each other; and the strike price for the match between the first and second offers is equal to the first and second offered prices.

7. The electronic marketplace of claim 1, wherein: the relationship between the first and second offers comprises the first offered price being different from the second offered price; and the strike price for the match between the first and second offers comprises a price between the first and second offered prices.

8. The electronic marketplace of claim 7, wherein the first offered price is greater than the second offered price and the strike price for the match between the first and second offers comprises the second offered price plus a predetermined fraction of the price difference between the first and second offered prices.

9. The electronic marketplace of claim 1, wherein a partial depletion of an offered quantity due to one or more matches is inaccessible to one or more market participant user computers.

10. The electronic marketplace of claim 1, wherein the one or more computers are further configured to remove an offer from the second side of the unbalanced market without giving one or more market participant user computers any indication whether the offer was removed due to the occurrence of a match between the offer and another offer or due to the cancellation of the offer.

11. A computer-implemented method for providing dynamic pricing in an unbalanced market, comprising:
   providing a first side of the unbalanced market comprising a plurality of market participant user computers coupled with an electronic marketplace;
   providing a second side of the unbalanced market comprising a plurality of market participant user computers coupled with the electronic marketplace, each market participant user computer associated with the first side of the unbalanced market having a larger market capacity than each market participant user computer associated with a second side of the unbalanced market and each market participant user computer associated with the second side of the unbalanced market having a smaller-capacity than each market participant user computer associated with the first side of the unbalanced market;
   receiving offers from the one or more market participant user computers that is associated with the first side of the unbalanced market and from the one or more market participant user computers that is associated with the second side of the unbalanced market, each offer comprising at least an offered price and an offered quantity;
   prioritizing among any offers associated with the first side of the unbalanced market that comprise equal offered prices and among any offers associated with the second side of the unbalanced market that comprise equal offered prices according to a predetermined prioritization scheme, the prioritization among such equally priced offers determining the order in which they are matched with other offers;
   matching a first offer associated with the first side of the unbalanced market with a second offer associated with the second side of the unbalanced market according to a relationship between a first offered price associated with the first offer and a second offered price associated with the second offer; and
   determining a strike price for the match between the first offer and the second offer based on the relationship between the first and second offered prices.

12. The method of claim 11, wherein:
   the first side of the unbalanced market comprises a bid side, the one or more market participant user computers that are associated with the first side of the unbalanced market comprise buyers, and the offers associated with the first side of the unbalanced market comprise bids; and
   the second side of the unbalanced market comprises an ask side, the one or more market participant user computers that are associated with the second side of the unbalanced market comprise sellers, and the offers associated with the second side of the unbalanced market comprise asks.

13. The method of claim 11, wherein the first side of the unbalanced market is sealed such that offered prices and offered quantities of offers associated with the first side of the unbalanced market are inaccessible to one or more market participant user computers.

14. The method of claim 11, wherein the second side of the unbalanced market is open such that offered prices of offers associated with the second side of the unbalanced market are accessible to one or more market participant user computers.

15. The method of claim 11, wherein the equally priced offers are prioritized according to the order in which they are received, an earlier-received offer being given a higher priority than a later-received offer having an equal offered price.

16. The method of claim 11, wherein: the relationship between the first and second offers comprises the first and second offered prices being equal to each other; and the strike price for the match between the first and second offers is equal to the first and second offered prices.

17. The method of claim 11, wherein: the relationship between the first and second offers comprises the first offered price being different from the second offered price; and the strike price for the match between the first and second offers comprises a price between the first and second offered prices.

18. The method of claim 17, wherein the first offered price is greater than the second offered price and the strike price for the match between the first and second offers comprises the second offered price plus a predetermined fraction of the price difference between the first and second offered prices.

19. The method of claim 11, wherein a partial depletion of an offered quantity due to one or more matches is inaccessible to one or more market participant user computers.

20. The method of claim 11, further comprising removing an offer from the second side of the unbalanced market without giving one or more market participant user computers any indication whether the offer was removed due to the occurrence of a match between the offer and another offer or due to the cancellation of the offer.

21. A computer-readable medium embodied with software enabling dynamic pricing in an unbalanced market, the software when executed using one or more computers is configured to:
   receive offers from one or more market participant user computers associated with a first side of the unbalanced market and from one or more market participant user computers associated with a second side of the unbalanced market, each offer comprising at least an offered price and an offered quantity;
   prioritize among any offers associated with the first side of the unbalanced market that comprise equal offered prices and among any offers associated with the second side of the unbalanced market that comprise equal offered prices according to a predetermined prioritization scheme, the prioritization among such equally priced offers determining the order in which they are matched with other offers;
   match a first offer associated with the first side of the unbalanced market with a second offer associated with the second side of the unbalanced market according to a relationship between a first offered price associated with the first offer and a second offered price associated with the second offer; and
   determine a strike price for the match between the first offer and the second offer based on the relationship between the first and second offered prices.

22. The computer-readable medium of claim 21, wherein:
   the first side of the unbalanced market comprises a bid side, the one or more market participant user computers that are associated with the first side of the unbalanced market comprise buyers, and the offers associated with the first side of the unbalanced market comprise bids; and
   the second side of the unbalanced market comprises an ask side, the one or more market participant user computers that are associated with the second side of the unbalanced market comprise sellers, and the offers associated with the second side of the unbalanced market comprise asks.

23. The computer-readable medium of claim 21, wherein the first side of the unbalanced market is sealed such that offered prices and offered quantities of offers associated with the first side of the unbalanced market are inaccessible to one or more market participant user computers.

24. The computer-readable medium of claim 21, wherein the second side of the unbalanced market is open such that offered prices of offers associated with the second side of the unbalanced market are accessible to one or more market participant user computers.

25. The computer-readable medium of claim 21, wherein the equally priced offers are prioritized according to the order in which they are received, an earlier-received offer being given a higher priority than a later-received offer having an equal offered price.

26. The computer-readable medium of claim 21, wherein:
the relationship between the first and second offers comprises the first and second offered prices being equal to each other; and
the strike price for the match between the first and second offers is equal to the first and second offered prices.

27. The computer-readable medium of claim 21, wherein:
the relationship between the first and second offers comprises the first offered price being different from the second offered price; and
the strike price for the match between the first and second offers comprises a price between the first and second offered prices.

28. The computer-readable medium of claim 27, wherein the first offered price is greater than the second offered price and the strike price for the match between the first and second offers comprises the second offered price plus a predetermined fraction of the price difference between the first and second offered prices.

29. The computer-readable medium of claim 21, wherein a partial depletion of an offered quantity due to one or more matches is inaccessible to all of one or more market participant user computers.

30. The computer-readable medium of claim 21, wherein the software is further operable to remove an offer from the second side of the unbalanced market without giving one or more market participant user computers any indication whether the offer was removed due to the occurrence of a match between the offer and another offer or due to the cancellation of the offer.

31. A system for providing dynamic pricing in an unbalanced market, the system comprising:
means for providing a first side of the unbalanced market comprising a plurality of market participant user computers coupled with an electronic marketplace;
means for providing a second side of the unbalanced market comprising a plurality of market participant user computers coupled with the electronic marketplace, each market participant user computer associated with the first side of the unbalanced market having a larger market capacity than each market participant user computer associated with a second side of the unbalanced market and each market participant user computer associated with the second side of the unbalanced market having a smaller-capacity than each market participant user computer associated with the first side of the unbalanced market;
means for receiving offers from the one or more market participant user computers that is associated with the first side of the unbalanced market and from the one or more market participant user computers that is associated with the second side of the unbalanced market, each offer comprising at least an offered price and an offered quantity;
means for prioritizing among any offers associated with the first side of the unbalanced market that comprise equal offered prices and among any offers associated with the second side of the unbalanced market that comprise equal offered prices according to a predetermined prioritization scheme, the prioritization among such equally priced offers determining the order in which they are matched with other offers;
means for matching a first offer associated with the first side of the unbalanced market with a second offer associated with the second side of the unbalanced market according to a relationship between a first offered price associated with the first offer and a second offered price associated with the second offer; and
means for determining a strike price for the match between the first offer and the second offer based on the relationship between the first and second offered prices.

32. An electronic marketplace for dynamic pricing in an unbalanced market, the electronic marketplace comprising:
a bid side of the unbalanced market comprising a plurality of buyers coupled with the electronic marketplace;
an ask side of the unbalanced market comprising a plurality of sellers coupled with the electronic marketplace, each buyer associated with the bid side of the unbalanced market having a larger market capacity than each seller associated with a ask side of the unbalanced market and each seller associated with the ask side of the unbalanced market having a smaller-capacity than each buyer associated with the bid side of the unbalanced market;
one or more computers collectively supporting the unbalanced market, the one or more computers collectively configured to:
receive bids from one or more buyers and asks from one or more sellers, each bid comprising at least a bid price and a bid quantity, each ask comprising at least an ask price and an ask quantity;
prioritize among any bids that comprise equal bid prices and among any asks that comprise equal ask prices according to the order in which they are received, an earlier-received bid or ask being given a higher priority than a later-received bid or ask having a equal bid or ask price, higher priority bids or asks being matched with asks or bids before lower-priority bids or asks are matched with asks or bids;
match a bid with an ask according to a relationship between a corresponding bid price and a corresponding ask price;
determine a strike price for the match between the bid and the ask based on the relationship between the corresponding bid and ask prices;
if the corresponding ask quantity is fully depleted due to the ask being matched with the bid, remove the ask from the market without giving one or more buyers or one or more sellers any indication whether the ask was removed due to the ask being matched with the bid or due to a cancellation of the ask; and
if the corresponding ask quantity is only partially depleted due to the ask being matched with the bid, reduce the corresponding ask quantity in accordance with the partial depletion without giving one or more buyers or one or more sellers any indication that the corresponding ask quantity was reduced.

* * * * *